United States Patent
Yellin

(10) Patent No.: US 8,548,028 B2
(45) Date of Patent: *Oct. 1, 2013

(54) METHOD AND APPARATUS FOR EQUALIZING CDMA SIGNALS

(75) Inventor: Daniel Yellin, Rannana (IL)

(73) Assignee: Marvell World Trade Ltd., St. Michael (BB)

( * ) Notice: Subject to any disclaimer, the term of this patent is extended or adjusted under 35 U.S.C. 154(b) by 41 days.

This patent is subject to a terminal disclaimer.

(21) Appl. No.: 13/430,635

(22) Filed: Mar. 26, 2012

(65) Prior Publication Data

US 2012/0183018 A1     Jul. 19, 2012

Related U.S. Application Data

(63) Continuation of application No. 12/015,187, filed on Jan. 16, 2008, now Pat. No. 8,144,748, which is a continuation of application No. 10/697,853, filed on Oct. 30, 2003, now Pat. No. 7,428,260.

(51) Int. Cl.
    *H04B 1/00* (2006.01)
(52) U.S. Cl.
    USPC ........... 375/147; 375/285; 375/350; 370/335; 370/342
(58) Field of Classification Search
    USPC .............. 375/130, 140, 142, 144, 147–148, 375/150, 343, 346, 285, 350; 370/335, 342
    See application file for complete search history.

(56) References Cited

U.S. PATENT DOCUMENTS

| | | | |
|---|---|---|---|
| 5,568,558 A | 10/1996 | Ramm et al. | |
| 5,572,552 A | 11/1996 | Dent et al. | |
| 5,687,162 A | 11/1997 | Yoshida et al. | |
| 6,034,986 A | 3/2000 | Yellin | |
| 6,151,358 A | 11/2000 | Lee et al. | |
| 6,426,973 B1 | 7/2002 | Madhow et al. | |
| 6,618,433 B1 | 9/2003 | Yellin | |
| 6,690,739 B1 | 2/2004 | Mui | |

(Continued)

FOREIGN PATENT DOCUMENTS

| | | |
|---|---|---|
| EP | 0 721 264 A1 | 7/1996 |
| WO | WO-98 18210 A2 | 4/1998 |
| WO | WO-01/22609 A1 | 3/2001 |
| WO | WO-2005/046075 A1 | 5/2005 |

OTHER PUBLICATIONS

Office Action in Chinese Application No. 200480039667.7, dated Feb. 27, 2009.

(Continued)

*Primary Examiner* — Jean B Corrielus

(57) ABSTRACT

A minimum mean square error (MMSE) equalizer corresponding to a plurality of receive antennas is generated using (i) channel information for a first plurality of users including a desired user, (ii) a ratio of white noise power to noise power due to code division multiple access (CDMA) signals corresponding to the first plurality of users, (iii) channel information for a second plurality of users served by another base station, and (iv) a ratio of noise power due to CDMA signals corresponding to the second plurality of users to noise power due to CDMA signals corresponding to the first plurality of users. CDMA signals received by a plurality of antennas are filtered using the MMSE equalizer. The CDMA signals are despread using a spread code corresponding to the desired user.

17 Claims, 6 Drawing Sheets

(56) References Cited

U.S. PATENT DOCUMENTS

| | | | |
|---|---|---|---|
| 6,879,623 B2 | 4/2005 | Agami et al. | |
| 6,956,893 B2 | 10/2005 | Frank et al. | |
| 7,039,095 B2 | 5/2006 | Takahashi | |
| 7,042,926 B2 | 5/2006 | Yellin et al. | |
| 7,058,116 B2 | 6/2006 | Moshavi et al. | |
| 7,180,881 B2 | 2/2007 | DiFazio | |
| 7,286,517 B2 | 10/2007 | Brunel | |
| 7,359,466 B2 | 4/2008 | Huang et al. | |
| 7,421,009 B2* | 9/2008 | Kawamoto et al. | 375/144 |
| 7,428,260 B2 | 9/2008 | Yellin | |
| 7,502,312 B2* | 3/2009 | Zhang et al. | 370/210 |
| 8,144,748 B2 | 3/2012 | Yellin | |
| 8,175,135 B1 | 5/2012 | Griniasty | |
| 2002/0136158 A1 | 9/2002 | Frank | |
| 2002/0191568 A1 | 12/2002 | Ghosh | |
| 2003/0014732 A1 | 1/2003 | Liu et al. | |
| 2003/0022636 A1 | 1/2003 | Ylitalo et al. | |
| 2003/0076872 A1 | 4/2003 | Jalloul et al. | |
| 2003/0081701 A1 | 5/2003 | Pick et al. | |
| 2003/0086479 A1 | 5/2003 | Naguib | |
| 2003/0095529 A1* | 5/2003 | Petre et al. | 370/342 |
| 2003/0095588 A1 | 5/2003 | Yellin et al. | |
| 2003/0142732 A1 | 7/2003 | Moshavi et al. | |
| 2004/0136444 A1 | 7/2004 | Massicotte et al. | |
| 2004/0141548 A1 | 7/2004 | Shattil | |
| 2004/0174939 A1 | 9/2004 | Wang | |
| 2004/0223480 A1 | 11/2004 | Nguyen et al. | |
| 2005/0036541 A1* | 2/2005 | McKown | 375/233 |
| 2005/0094713 A1 | 5/2005 | Yellin | |
| 2007/0117527 A1 | 5/2007 | Xu et al. | |
| 2008/0080594 A1 | 4/2008 | Naguib | |

OTHER PUBLICATIONS

Office Action in European Application No. 04 818 321.4, dated Jul. 15, 2011.

Office Action in Chinese Application No. 201010228297.9, dated Mar. 23, 2011.

Office Action in Chinese Application No. 200480039667.7, dated Aug. 28, 2009.

"3rd Generation Partnership Project; Technical Specification Group Radio Access Network; User Equipment (UE) radio transmission and reception (FDD) (Release 8)," 3GPP TR 25.101 V8.0.0 Technical Report, 3GPP, Valbonne France, pp. 1-78 (2007).

Written Opinion for International Application No. PCT/US00/22504, dated Aug. 2, 2001.

"3rd Generation Partnership Project; Technical Specification Group Radio Access Network; User Equipment (UE) radio transmission and reception (FDD) (Release 8)," 3GPP TR 25.101 V8.6.0 Technical Report, 3GPP, Valbonne France, pp. 1-78 (2009).

Change request on "Specification of enhanced performance requirements type 3i for HSDPA based on two-branch equaliser with interference cancellation," TSG-RAN-Working Group 4 (Radio), Meeting #45, Jeju, Korea (Nov. 5-9, 2007).

M. Juntti et al., *Overview on Linear Multiuser Equalizers for DS-CDMA Systems*, in *Wireless Communication Technologies: New Multimedia Systems*, pp. 114-129 (N, Morinaga et al., eds, (2002).

"3rd Generation Partnership Project; Technical Specification Group Radio Access Network; Physical layer aspects of UTRA High Speed Downlink Packet Access (Release 4)," *3GPP TR 25,848 V4.0.0 Technical Report*, 3GPP, Valbonne France, pp. 1-89 (2001).

"Revised HSDPA UE Performance Requirements," *TSG-RAN-Working Group 4(Radio)*,Meeting #20, East Brunswick, NJ, USA, 3GPP TS 25.101 V3.7.0. pp. 1-4 (Nov. 12-16, 2001).

"Comments on the CPICH Interference Cancellation Scheme," TSG-RAN-Working Group 4, Meeting #21, Sophia Antipolis, France (Jan. 28-Feb. 1, 2002).

Verdu, *Multiuser Detection*, Cambridge University Press, Table of Contents and pp. 154-213, 234-272, 288-329, 344-387 (1998).

Bottomley, G.E., "A Generalized RAKE Receiver for Interference Suppression," *IEEE Journal on Selected Areas in Communication*, vol. 18, No. 8, Aug. 2000, pp. 1536-1545.

Hooli, et al., "Inter-path Interference Suppression in WCDMA Systems with Low Spreading Factors," IEEE VTC Conference Proceedings pp. 421-425 (1999).

Hooli et al., "Performance Evaluation of Adaptive Chip-Level Channel Equalizers in WCDMA Downlink," *IEEE Conference Proceedings*, pp. 1974-1979 (2001).

Lenardi, et al., "A RAKE Receiver with Intracell Interference Cancellation for a DS-CDMA Synchronous Downlink with Orthogonal Codes," *IEEE VTC 2000*, pp. 430-434 (2000).

Lenardi, et al., "SINR Maximizing Equalizer Receiver for DS-CDMA," Signal Processing X: Theories and Applications; Proceeds of EUSIPCO, vol. 1, pp. 83-86 (Sep. 2000).

International Search Report from PCT-US2004-035893 (Apr. 6, 2005), 14 pages.

Haifeng, et al., "Joint Multiuser Detector with Decoding and Feedback in Asynchronous CDMA Systems," *IEEE ISSSTA, IEEE International Symposium on Spread Spectrum Techniques and Applications*, 1, pp. 160-164 (1998).

Liu, et al., "Group-Blind Multiuser Detector for Uplink in CDMA Systems," *Journal of Zhejang University* 36 (6), pp. 646-649 (Nov. 1, 2002).

Misra, et al., "A Computationally Efficient Hybrid of Joint Detection and Successive Interference Cancellation," *IEEE Vehicular Technology Conference*, 3 of 4, Conf. 53, VTC 2001 Spring, pp. 1784-1788 (May 6, 2001).

Wang, et al., "Blind Equalization and Multiuser Detection in Dispersive CDMA Channels," IEEE Transactions on Communications, IEEE Inc., 46 (1), pp. 91-103 (Jan. 1998).

Yu, et al., "Subspace Tracking for Group-Blind Multiuser Detectors," *Vehicular Technology Conference*, 1999 IEEE, 2, pp. 1042-1046 (May 16, 1999).

Office Action in corresponding Chinese Application No. 201010228297.9, dated Mar. 19, 2012.

Griniasty, U.S. Appl. No. 13/462,840, "Equalizer with Adaptive Noise Loading," filed May 3, 2012.

\* cited by examiner

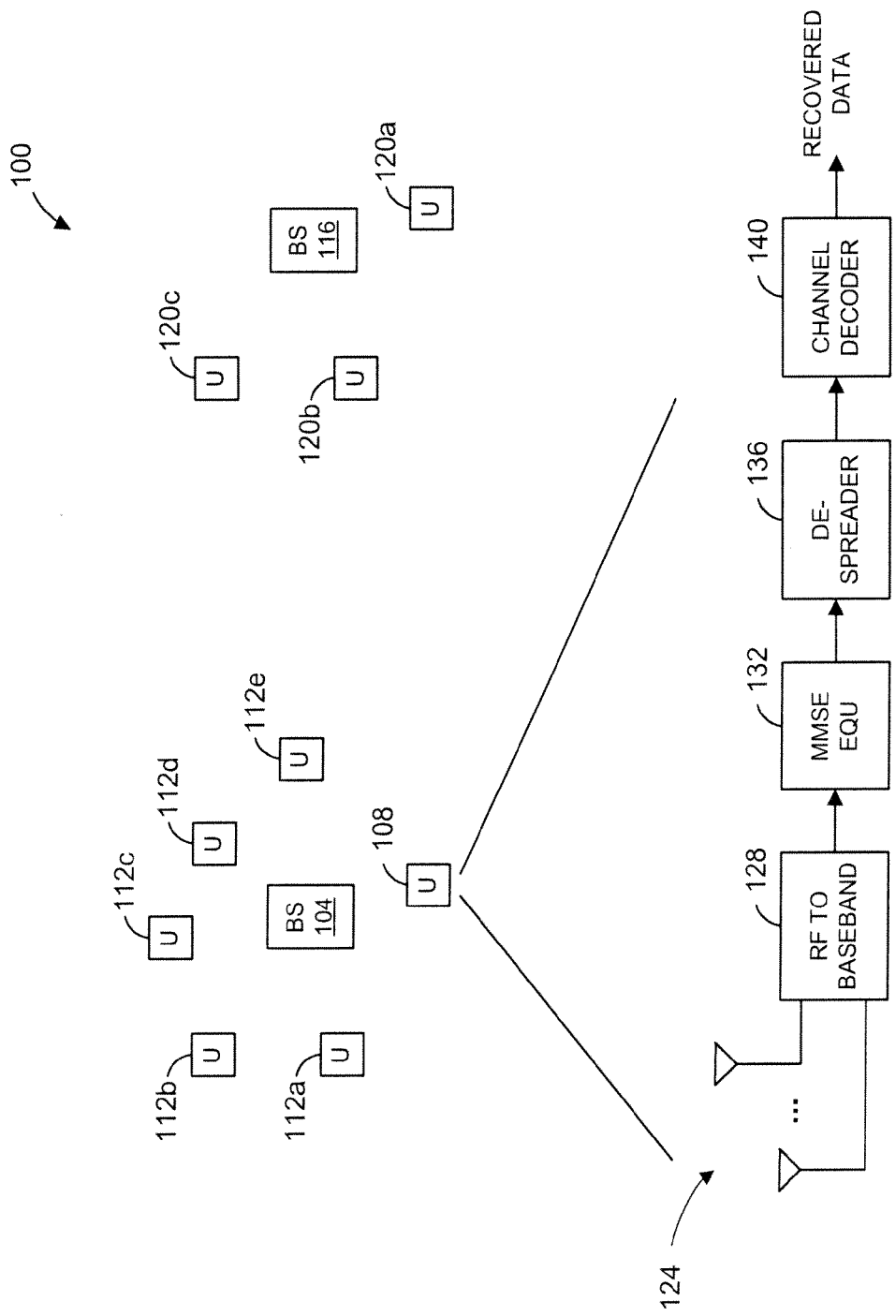

METHOD AND APPARATUS FOR EQUALIZING CDMA SIGNALS

RELATED APPLICATION DATA

The present application is a continuation of U.S. patent application Ser. No. 12/015,187, now U.S. Pat. No. 8,144,748, entitled "Method and Apparatus for Equalizing CDMA Signals," filed Jan. 16, 2008, which is a continuation of U.S. patent application Ser. No. 10/697,853, now U.S. Pat. No. 7,428,260, entitled "A Unified MMSE Equalization and Multi-User Detection Approach for Use in a CDMA System," filed Oct. 30, 2003. The above-identified applications are hereby incorporated by reference herein in their entireties.

FIELD OF THE DISCLOSURE

The present disclosure relates generally to wireless communications and, more particularly, to methods and structures for detecting data within a wireless system.

BACKGROUND

Code division multiple access (CDMA) is a multiple access technique in which a plurality of substantially orthogonal codes (usually taking the form of pseudo-random noise sequences) are used to spread spectrum modulate user signals within a system. Each modulated user signal may have an overlapping frequency spectrum with other modulated user signals in the system. However, because the underlying modulation codes are orthogonal, it is possible to demodulate individual user signals by performing a correlation operation using the appropriate code. As can be appreciated, a communication device operating within a CDMA-based system will often receive overlapping communication signals associated with a variety of different users. The signals associated with other users will typically appear as interference when trying to demodulate a signal associated with a desired user within the communication device. There is an ongoing need for techniques and structures for efficiently and/or accurately demodulating user signals in a CDMA environment.

BRIEF DESCRIPTION OF THE DRAWINGS

FIG. 6 is a block diagram illustrating an example communication system including a multiple antenna receiver having a channel dependent minimum mean square error MMSE equalizer and a despreader in accordance with an embodiment of the present invention.

DETAILED DESCRIPTION

Figure 1:
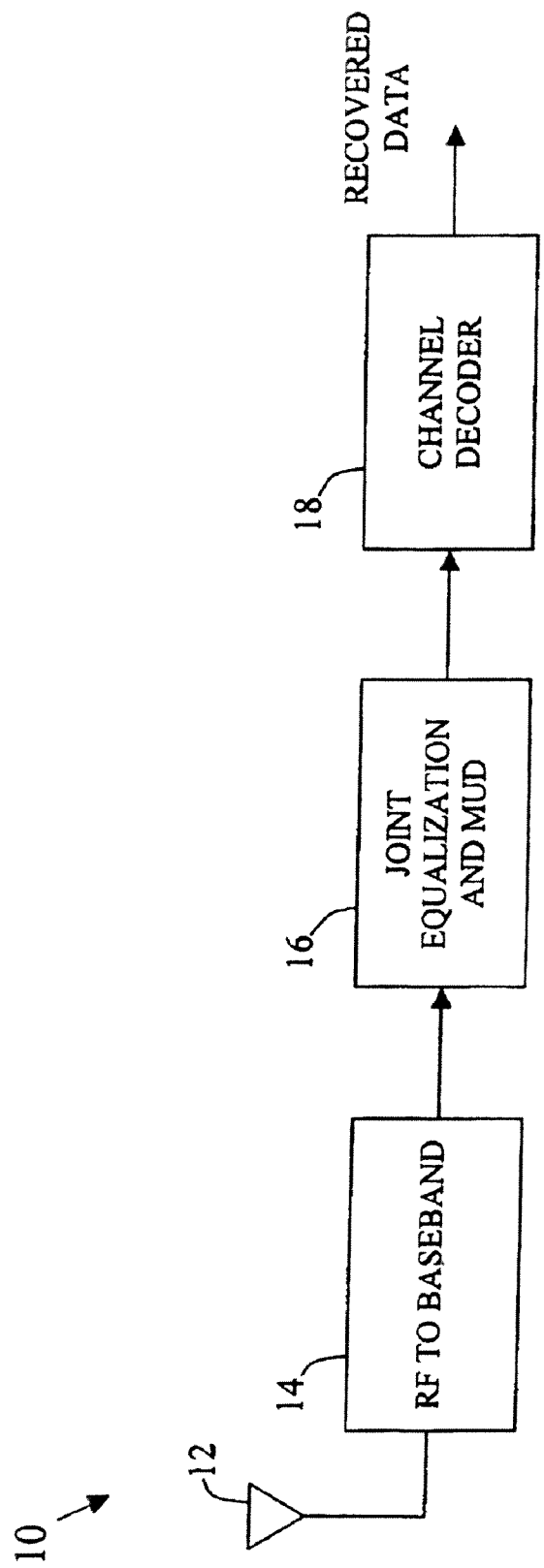
FIG. 1 is a block diagram illustrating an example receiver arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The commonly used RAKE receiver is known to be an optimal solution for demodulating a CDMA signal received from an additive white Gaussian noise (AWGN) channel. However, in a multiple access interference (MAI) environment (as encountered in, for example, cellular CDMA systems), the RAKE receiver is not optimal and in some cases is very far from the optimal solution. In recent years, significant efforts have been devoted to developing advanced CDMA receiver techniques in order to improve CDMA network performance. Multi-user detection (MUD) techniques, in which the receiver jointly demodulates users (i.e., the desired user signal as well as the other interfering user signals), are one example of an advanced CDMA receiver technology. MUD techniques are capable of significantly improving demodulation performance by utilizing knowledge about the MAI associated with the jointly demodulated users. Channel equalization techniques that are applied at the chip domain represent another advanced receiver technology that is applicable only to orthogonal CDMA. The key idea in chip-rate equalization techniques is to equalize the communication channel to become close to a unitary transformation, thus restoring the orthogonality of the transmitted signal that was destroyed in the channel. By doing so, cross-talk between different users (of the same base station) is reduced because the orthogonality of the signature codes that was compromised in the channel is at least partially restored. In cellular systems, this method may be applicable only to down-link users of the active base station as these are typically the only users that are orthogonal to the desired user.

In at least one embodiment of the present invention, a unified MUD-equalization approach is provided for demodulating direct sequence CDMA (DS-CDMA) signals. The unified approach is capable of generating a variety of cost-effective receiver demodulation techniques that may range from, for example, a low cost linear minimum mean square error (MMSE) equalization technique (which may provide the lowest performance gains compared to the RAKE receiver) to a relatively high complexity MMSE MUD (which may provide the largest performance gains). In between, various performance/complexity tradeoffs may be chosen. Hereinafter, the term "equalization" will be used to represent optimal means square error (MSE) processing that is "signature independent" and thus may be extended to include signals from other base stations that are not orthogonal to a desired user.

FIG. 1 is a block diagram illustrating an example receiver arrangement 10 in accordance with an embodiment of the present invention. As illustrated, the receiver arrangement 10 may include at least one of: an antenna 12, a radio frequency (RF) to baseband subsystem 14, a joint equalization and MUD unit 16, and a channel decoder 18. The antenna 12 may receive a composite CDMA signal from a wireless channel that includes overlapping signal components associated with multiple users in the system. In addition to a desired user, the composite signal may include signal components from other users associated with the same base station as the desired user and/or other users associated with other base stations. Any form of antenna 12 may be used including, for example, a dipole, a patch, a helix, an array, and/or others, including combinations of the above. In at least one embodiment, antenna diversity techniques are used. The RF to baseband subsystem 14 converts the received signal from an RF representation to a baseband representation. The RF to baseband subsystem 14 may include components such as, for example, a low noise amplifier, one or more RF filters, one or more frequency conversion devices (e.g., mixers, etc.), and/or any other components needed to convert the received signal to baseband. As will be described in greater detail, the joint equalization and MUD device 16 is operative for detecting data within the composite received signal that is associated with the desired user, using a unified MUD/equalization approach. The channel decoder 18 decodes the detected data, based on a predetermined channel code, to recover the user data for the desired user. Any form of channel code may be used. In at least one embodiment, no channel coding is used.

Figure 2:
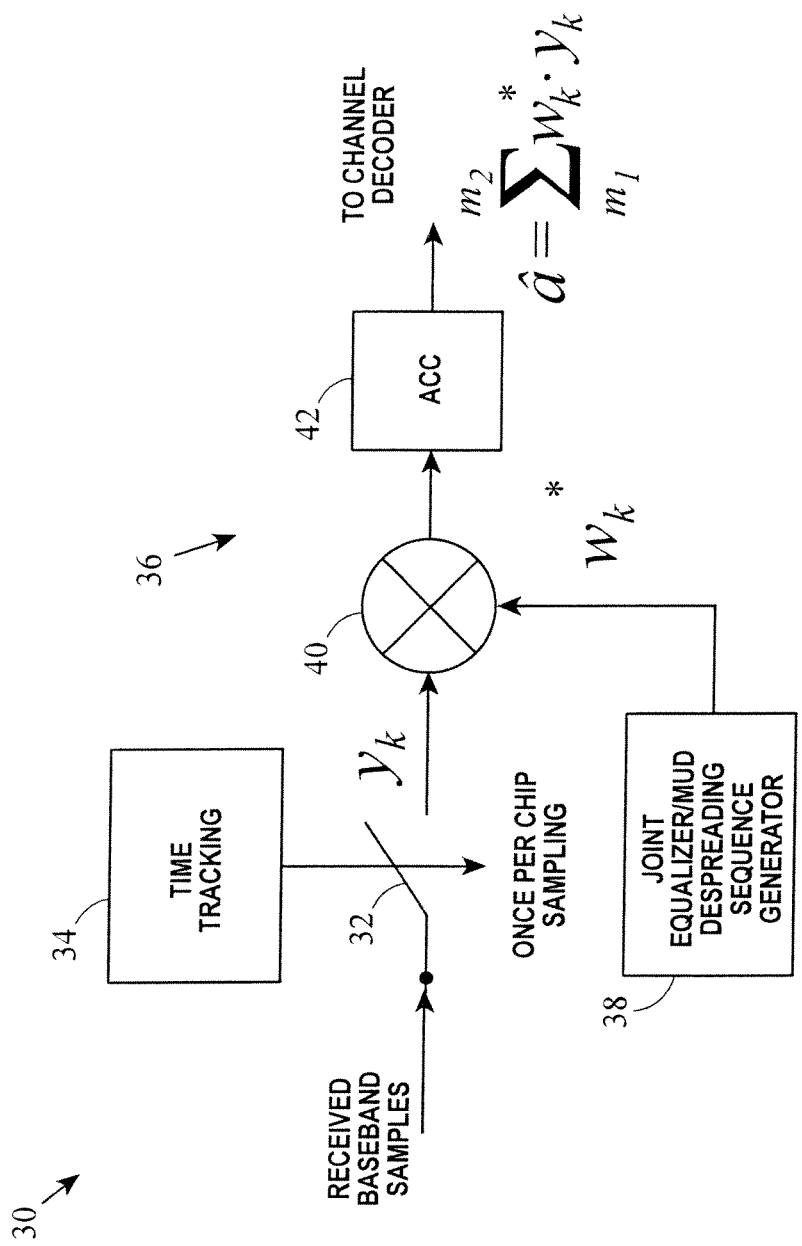
FIG. 2 is a block diagram illustrating an example joint equalization and MUD device in accordance with an embodiment of the present invention.

FIG. 2 is a block diagram illustrating an example joint equalization and MUD device 30 in accordance with an embodiment of the present invention. The joint equalization and MUD device 30 may be used within, for example, the receiver arrangement 10 of FIG. 1 and/or within CDMA receivers having other architectures. As illustrated, the joint equalization and MUD device 30 includes: a sampler 32, a time tracking unit 34, a despreader 36, and a joint equalizer/MUD despreading sequence generator 38. The despreader 36 includes a multiplier 40 and an accumulator 42. The time tracking unit 34 causes the sampler 32 to sample the received baseband samples at the chip rate to generate chip rate samples $y_k$. The despreader 36 despreads the received signal by multiplying (i.e., within the multipler 40) the chip rate samples by a despreading sequence generated by the joint equalizer/MUD despreading sequence generator 38 and then summing (i.e., within the accumulator 42) the result over the symbol period to generate a desired user symbol â at an output thereof. The desired user symbols may then be delivered to a channel decoder for decoding. In at least one embodiment of the invention, as will be described in greater detail, a despreading sequence may be generated by the joint equalizer/MUD despreading sequence generator 38 that can combine equalization and MUD processing in a manner that can achieve enhanced despreading performance while also addressing computational complexity concerns.

In at least one implementation, a despreading sequence may be generated by first dividing the current users in a system into two groups. A first group (i.e., group 1) consists of users whose signature sequences are "assumed" to be known to the receiver and a second group (i.e., group 2) consists of users whose signature sequences are "assumed" to be unknown to the receiver and whose first and second order statistics comply with those of the true signals. The number of users in group 1 may be denoted as K and the number of users in group 2 may be denoted as L (or L+1, where the +1 is used to represent additive white noise in the system). As will be described in greater detail, when K and L are varied, different receiver architectures and performance can be achieved. Users in group 1 will generally be treated using MUD-type processing. This processing will typically result in higher performance at the expense of higher computational complexity. Users in group 2, on the other hand, will generally be treated using equalization-type processing, which will typically result in lower performance with less computational complexity. In general, as the number of users assigned to group 2 increases, the overall performance will degrade and the overall computational complexity will decrease.

It should be appreciated that, in at least one embodiment of the invention, the decision as to which group a particular user is placed in does not necessarily depend upon whether or not the signature of that user is actually known in the receiver. In fact, in many situations, a receiver may know the signatures of all current users. Instead, the decision may be based upon a tradeoff between performance and computational complexity in the receiver. That is, a decision may be made to treat certain users in one way and other users in another way to achieve a tradeoff between performance and complexity. In one approach, for example, all users associated with the same base station as a desired user may be placed in group 1, while all users associated with other base stations are placed in group 2 (i.e., even if their signatures are known to the receiver). In this manner, overall computational complexity may be reduced by limiting application of MUD processing to users associated with the serving base station (i.e., the base station associated with the desired user). Other techniques for assigning the users to the two groups may alternatively be used. In at least one embodiment, the technique that is used to assign users to the two groups may change over time (e.g., it may be definable and/or modifiable by a primary user of a receiver, etc.).

As described above, in at least one implementation, various different receiver architectures may be achieved by varying the values of K and L in a receiver. For example, if K=1 and L=0, the well known RAKE receiver may be achieved (with optimized weights). The maximal-ratio combining (MRC) RAKE receiver may be obtained as a special case when the signal to noise ratio (SNR) approaches zero (in any other case, MRC is known to be sub-optimal). In another example, if K=1 and L=the number of users in the serving base station−1, the conventional MMSE equalizer may be achieved. In yet another example, if K=all current users, then the full blown MUD receiver may be achieved. In addition, by selecting K and L in a different manner from the above examples, a variety of cost effective joint MUD-equalization receiver techniques may be achieved that are able to handle both inter-symbol interference (ISI) and multiple access interference (MAO optimally (under the MSE criterion) for a given level of complexity. In this manner, a performance/complexity tradeoff may be achieved.

In the discussion that follows, a general technique for determining a joint equalizer/MUD despreading sequence is described. In a CDMA receiver, the baseband equivalent received signal may be represented as follows:

$$y(t) = \sum_{k=0}^{K-1} s_k(t) \otimes h_k(t) + \sum_{l=0}^{L-1} n_l(t) \otimes g_l(t) \qquad \text{(Equation 1)}$$

where $s_k(t)$ are the DS-CDMA signals whose signatures are assumed to be known to the receiver (without loss of generality $s_0(t)$ is assumed throughout to be the desired signal), $h_k(t)$ is the k-th channel impulse response (i.e., the impulse response that the k-th DS-CDMA signal propagates through, including the transmitter and receiver filtering effects), ⊗ denotes the convolution operator, $n_l(t)$ is a white noise process, and $g_l(t)$ is an arbitrary impulse response whose characterization is provided below. Let $g_0(t)$ be equal to the impulse response of the receiver filter. Therefore, the first term in the second summation of Equation 1 is just the contribution of a white noise process to the baseband signal (e.g., the thermal noise of the receiver chain). The other $n_l(t)$ terms are used to represent DS-CDMA signals whose signatures are assumed to be unknown to the receiver, with $g_l(t)$ representing their respective channels (which are assumed known to the receiver). It should be reiterated that the distinction between CDMA users whose signature is assumed known to those whose signature is assumed unknown may be relevant as it relates directly to the cost/performance tradeoffs. It should also be noted that conventional random spreading assumptions and the fact that the chip-shaping is embedded in $g_l(t)$ immediately imply the temporal whiteness of $n_l(t)$. The resulting overall signal $n_l(t) \otimes g_l(t)$ as just defined, complies in its first and second-order statistics (which is what is needed for MSE analysis) with randomly spread DS-CDMA signals. Furthermore, statistical independence between the data streams of the different users results in statistical independence between the different signals (i.e., $s_k(t)$'s and $n_l(t)$'s). Thus, the following two assumptions may be made regarding the signals in Equation 1, which are sufficient for all of the derivations that follow:

Assumption 1—Lack of Correlation Between the Different Users:

$$E\{s_{k_1}(t) \cdot s_{k_2}(t-\tau)^*\}=0, \forall k_1 \neq k_2, \forall \tau;$$

$$E\{n_{k_1}(t) \cdot n_{k_2}(t-\tau)^*\}=0, \forall k_1 \neq k_2, \forall \tau;$$

$$E\{s_{k_1}(t) \cdot n_{k_2}(t-\tau)^*\}=0, \forall k_1, k_2, \tau \quad \text{(Equation 2)}$$

Assumption 2—Temporal Whiteness of the DS-CDMA Signals Whose Signatures are Unknown to the Receiver:

$$E\{n_k(t) \cdot n_k(t-\tau)^*\}=0 \ \forall k, \forall \tau \neq 0 \quad \text{(Equation 3)}$$

Solely for purposes of convenience, it is assumed that the symbol sequences of the different users are uncorrelated both temporally and between the users. However, it should be stressed that this assumption is merely for convenience and that it would be straightforward to derive the solution for other symbol distributions.

The simple format of Equation 1 allows different receiver architectures to be investigated by appropriately defining the various parameters appearing in the equation and deriving the MMSE solution. In the following discussion, a general MMSE solution is first derived for the model of Equation 1. Then, it is shown how different receiver architectures may be derived from the general solution. The MMSE output for the n-th symbol (denoted by $\hat{a}_0(n)$) may be expressed as follows:

$$\hat{a}_0(n) = \sum_{j=m_1}^{m_2} w_j^*(n) \cdot y(j \cdot T_s) \quad \text{(Equation 4)}$$

where $T_s$ is the sampling interval at the receiver (which is normally an integer fraction of $T_c$, the chip period), and $j \in m_1, m_1+1, \ldots, m_2$ is an appropriate pre-defined observation window centered around the n-th symbol. Typically, $(m_2 - m_1) \cdot T_s$ would be of the same order as the spreading factor (SF) multiplied by $T_c$, although somewhat larger. The exact value depends on the delay spread of the channel and may be a user definable parameter dictated by performance/complexity tradeoffs. When the delay spread of the channel is larger than the symbol duration, it may be desirable to let the observation window span more than the symbol. In such a setting, the proposed approach also mitigates the inter-symbol interference (ISI) generated by the channel. This may be of particular importance for low spreading factors which are becoming more and more popular for high data rate applications. In vector notation, Equation 4 becomes:

$$\hat{a}_0(n) = \overline{W}_n^+ \cdot \overline{Y}_n \quad \text{(Equation 5)}$$

As is well known, the MMSE solution for $K_l$ is given by:

$$\overline{W}_n = E\{\overline{Y}_n \cdot \overline{Y}_n^+\}^{-1} \cdot E\{\overline{Y}_n \cdot a_0(n)^*\} \quad \text{(Equation 6)}$$

where $a_0(n)$ denotes the desired user symbol. Using Equation 1 and Assumption 1, it can be shown that:

$$E\{\overline{Y}_n \cdot a_0(n)^*\} = \overline{P}_{eq\_0}(n) \cdot E\{|a_0(n)|^2\} \quad \text{(Equation 7)}$$

where $\overline{P}_{eq\_0}(n)$ is the equivalent spreading sequence of the desired symbol taking into account the channel effects (see Equation 8 and Equation 9 below). Let $c_k(i)$ denote the chip sequence of the k-th user and define:

$$P_{eq\_k}(t,n) = \sum_{i=n \cdot SF+1}^{(n+1) \cdot SF} c_k(i) \cdot h_k(t - i \cdot T_c) \quad \text{(Equation 8)}$$

Then, the elements of $\overline{P}_{eq\_0}(n)$ are taken to be the $T_s$ spaced samples of the "equivalent" spreading sequence of the desired user corresponding to the respective symbol $a_0(n)$ (i.e., substitute k=0 and $t=m_1 \cdot T_s, (m_1+1) \cdot T_s, \ldots, m_2 \cdot T_s$ in Equation 8 above). This may be expressed mathematically as:

$$\{\overline{P}_{eq\_0}(n)\}_j = \sum_{i=n \cdot SF+1}^{(n+1) \cdot SF} c_0(i) \cdot h_0((j+m_1-1) \cdot T_s - i \cdot T_c) \quad \text{(Equation 9)}$$

$$j = 1, 2, \ldots, (m_2 - m_1 + 1)$$

which could also be expressed in matrix notation as:

$$\overline{P}_{eq\_0}(n) = H_0 \cdot \overline{C}_0(n) \quad \text{(Equation 10)}$$

where $H_0$ is the Toeplitz matrix whose i,j-th element is $h_0((i+m_1-1) \cdot T_s - j \cdot T_c)$ and the i-th element of the chip-vector $\overline{C}_0(n)$ is the i-th chip, $c_0(i)$. It is noted that Equation 7 through Equation 9 follow from Equation 1 by utilizing the following conventional DS-CDMA model for $s_k(t)$:

$$s_k(t) = \sum_{i=-\infty}^{\infty} a_k\left(\left\lfloor \frac{i-1}{SF} \right\rfloor\right) \cdot c_k(i) \cdot \delta(t - i \cdot T_c) \quad \text{(Equation 11)}$$

where $\lfloor x \rfloor$ denotes the integer part of x (and the symbol index), $\delta(t)$ represents the Dirac delta function, and noting that:

$$\overline{Y}_n = P_{eq}(n) \cdot \overline{a}(n) + \overline{e}(n) \quad \text{(Equation 12)}$$

where $P_{eq}$ is the $(m_2-m_1+1) \times \tilde{K}$ matrix whose k-th column is $\overline{P}_{eq\_k}(n)$ (i.e., the vector obtained by calculating Equation 8 for $t=m_1 \cdot T_s, (m_1+1) \cdot T_s, \ldots, m_2 \cdot T_s$) and $\overline{a}$ is the $\tilde{K} \times 1$ vector of symbols associated with the different "users."

Due to edge effects (e.g., when the observation window spans more than a single symbol period or when the channel delay spread is non-zero), the vector $\overline{a}$ may need to contain several consecutive symbols for each user (e.g., the n−1, n, and n+1 symbols per user). Otherwise, the model of Equation 12 may hold only approximately (up to the edge effects). When the channel delay spread is smaller than the symbol period (which is often the case) and the observation window is not too large, the above three consecutive symbols will typically be sufficient to assure negligible edge effects. In this case, the additional symbols are considered as additional "users," hence $\tilde{K} \geq K$ (e.g., when the n−1, n, and n+1 symbols are used, then $\tilde{K}=3 \cdot K$). Consequently, $\overline{P}_{eq\_k}(n)$ may contain zeros corresponding to those sampling instances where the relevant symbol has no effect. Finally $\overline{e}$ is the vector whose elements are $$\sum_{l=0}^{L-1} n_l(t) \otimes g_l(t) \text{ at } t = m_1 \cdot T_s,$$

$$(m_1+1) \cdot T_s, \ldots, m_2 \cdot T_s.$$

From Equation 12, it may be shown that $E\{\overline{Y} \cdot \overline{Y}^+\}$ can be calculated as follows:

$$E\{\overline{Y}_n \cdot \overline{Y}_n^+\} = P_{eq}(n) \cdot \text{Diag}\{E\{|a_0(n)|^2\}, \ldots, E\{|a_{\tilde{K}-1}(n)|^2\}\} \cdot \quad \text{(Equation 13)}$$

$$P_{eq}(n)^+ + E\{\overline{e} \cdot \overline{e}^+\}$$

$$= \sum_{k=0}^{\tilde{K}-1} E\{|a_k(n)|^2\} \cdot \overline{P}_{eq\_k}(n) \cdot \overline{P}_{eq\_k}(n)^+ +$$

$$\sum_{l=0}^{L-1} N_l \cdot T_l$$

where $N_l$ is the power spectral density of $n_l(t)$ and $T_l$ is the Toeplitz matrix whose i,j-th element is:

$$\{T_l\}_{i,j} \equiv \int g_l([i-j] \cdot T_s + t) \cdot g_l(t)^+ dt = \quad \text{(Equation 14)}$$

$$\frac{1}{2 \cdot \pi} \int |G_l(w)|^2 \cdot e^{jw(i-j)T_s} dw$$

It is well known that a chip-spaced sampling of the matched filter output (i.e., the receiver filter that is matched to the transmitter shaping filter having its output sampled at the chip rate) constitutes sufficient statistics for the estimation of $a_0(n)$ in a variety of settings. Hence, when chip spaced sampling is performed, the following may be substituted in Equation 14 to simplify the derivations:

$$T_s = T_c \quad \text{(Equation 15)}$$

Since practical receiver implementations often utilize higher sampling rates than the chip rate (typically for the purpose of time-tracking and/or for simplifying the requirements from the anti-aliasing analog filters and analog-to-digital converters (A/D's), such a substitution may not be desirable. Nevertheless, the demodulation itself is often performed at the chip rate and not at the higher sampling rate (e.g., the RAKE fingers). It is also noted that the receiver filter is often simply a unit-gain low pass filter (LPF) of bandwidth $\frac{1}{2} \cdot T_c$ (i.e., one-sided) or some other Nyquist filter (e.g., a square-root raised cosine, etc.), in which case it may be shown from Equation 15 that:

$$T_0 \equiv \frac{1}{T_c} \cdot I \quad \text{(Equation 16)}$$

which follows from the fact that the chip-spaced correlation sequence of the receiver filter is obviously a Kronecker delta function in these cases (recall that $g_0(t)$ was set to be the impulse response of the receiver filter and Equation 16 simply implies that after receiver filtering, the variance of the white noise term is $N_0/T_c$, as expected).

While not directly related to equalization and/or MUD, it is still useful to examine the RAKE receiver in the context of the present invention. To do this, a minimal amount of knowledge will be assumed at the receiver. That is, it is assumed that only the signature of the desired user is known (i.e., K=1) and nothing is known about the interference which is modeled to be white noise (i.e., L=1). It is also assumed that chip-rate sampling is being used (i.e., Equation 15). Using Equations 6, 7, 8, 13, and 16, it may be shown that the solution is given by:

$$\overline{w}_n = E\{\overline{Y}_n \cdot \overline{Y}_n^+\}^{-1} \cdot E\{\overline{Y}_n \cdot a_0(n)^*\} \quad \text{(Equation 17)}$$

$$= \left[\sum_{k \in \Omega_0} \overline{P}_{eq\_k}(n) \cdot \overline{P}_{eq\_k}^+(n) + \frac{N_0/T_c}{E\{|a_0(n)|^2\}} \cdot I\right]^{-1} \cdot$$

$$\overline{P}_{eq\_0}(n)$$

where $\Omega_0$ is the set representing the "user" indexes corresponding to symbols of the desired user (i.e., the users whose symbols are . . . , $a_0(n-1)$, $a_0(n)$, $a_0(n+1)$, . . . (obviously $0 \in \Omega_0$)).

Next, it is assumed that $E\{|a_0(n)|^2\} \ll N_0/T_c$ (i.e., the pre-despread user power is small compared to the total noise power, as is the case in CDMA systems where each user is normally assigned a small portion of the total transmitted power), in which case Equation 17 can be approximated by:

$$\overline{w}(n) \approx \frac{E\{|a_0(n)|^2\}}{N_0/T_c} \cdot \overline{P}_{eq\_0}(n) \quad \text{(Equation 18)}$$

that apart for the gain term (which is irrelevant for demodulation performance) is exactly a matched filter to the desired user signature sequence and coincides with the well known rake receiver (which is in-fact a matched filter).

It is interesting to note that the exact MMSE solution for the situation given in Equation 17 mitigates self-MAI (i.e., the first terra in the bracketed expression) and is therefore expected to provide better performance compared with the RAKE receiver. However, this receiver is more complicated than the RAKE and the expected performance improvement may not justify the added cost.

The simplest receiver structure apart from the above-described conventional RAKE receiver is the chip-rate equalizer. To derive this equalizer, it is assumed that the receiver mitigates the MAI of the serving base station via equalization and treats all other users in the system as white noise. Thus, the following parameters may be used in Equation 1: K=1 (i.e., the receiver is assumed to know only the signature of the desired user) and L>1 (and, in this setting, L equals the number of users in the active base). Also, it may be assumed that:

$$g_l(t) = h_0(t), l=1, \ldots, L \quad \text{(Equation 19)}$$

That is, that all of the interfering signals undergo the same channel as the desired signal (which is the case for all downlink users of the serving base station). All other users that are not associated with the serving base station are modeled as white Gaussian noise (i.e., $n_0$ (t) models out-of-cell MAI). It is also assumed that chip-rate sampling is being used (i.e., Equation 15).

Based on the above, the optimal MMSE solution is given by substituting these parameters into Equations 6, 7, and 8, which results in the following:

$$\bar{w}_n = E\{\bar{Y}_n \cdot \bar{Y}_n^+\}^{-1} \cdot E\{\bar{Y}_n \cdot a_0(n)^*\} = \quad \text{(Equation 20)}$$

$$\left[ \sum_{k \in \Omega_0} \bar{P}_{eq\_k}(n) \cdot \bar{P}_{eq\_k}^+(n) + \sum_{l=1}^{L} \frac{N_l}{E\{|a_0(n)|^2\}} \cdot T_L + \frac{N_0/T_c}{E\{|a_0(n)|^2\}} \cdot I \right]^{-1} \cdot \bar{P}_{eq\_0}(n)$$

where $T_L$, is the channel's correlation Toeplitz matrix (which is obtained by substituting Equation 19 into Equation 14). Again, the first term in the bracketed expression represents combating self-MAI. If we assume that the (pre-despread) user power is small compared to the (pre-despread) total power, then Equation 20 reduces to:

$$\bar{w}_n = E\{\bar{Y}_n \cdot \bar{Y}_n^+\}^{-1} \cdot E\{\bar{Y}_n \cdot a_0(n)^*\} \quad \text{(Equation 21)}$$

$$\approx \left[ \sum_{l=1}^{L} \frac{N_l}{E\{|a_0(n)|^2\}} \cdot T_L + \frac{N_0/T_c}{E\{|a_0(n)|^2\}} \cdot I \right]^{-1} \cdot \bar{P}_{eq\_0}(n)$$

$$= \left[ \sum_{l=1}^{L} \frac{N_l}{E\{|a_0(n)|^2\}} \cdot T_L + \frac{N_0/T_c}{E\{|a_0(n)|^2\}} \cdot I \right]^{-1} \cdot H_0 \cdot \bar{C}_0(n)$$

where Equation 10 was invoked in the transition to the second row of Equation 21. Note that the only dependence on the symbol index is through the vector of chips of the desired user. Therefore, this receiver can be implemented by first applying the channel-dependent (but symbol independent) transformation:

$$\bar{Z}_n \equiv H_0^+ \cdot \left[ \sum_{l=1}^{L} \frac{N_l}{E\{|a_0(n)|^2\}} \cdot T_L + \frac{N_0/T_c}{E\{|a_0(n)|^2\}} \cdot I \right]^{-1} \cdot \bar{Y}_n \quad \text{(Equation 22)}$$

followed by a simple despreader:

$$\hat{a}_0(n) = \bar{C}_0(n)^+ \cdot \bar{Z}_n \quad \text{(Equation 23)}$$

In order to gain some insight into the operation of this receiver, it is noted that $T_L$ is the channel auto-correlation function (see Equation 19 and Equation 14). Thus, up to edge effects can be approximated (at least for exponentially stable channels) by:

$$T_L \cong \frac{1}{T_c} H_0 \cdot H_0^+ \quad \text{(Equation 24)}$$

To verify Equation 24 for, for example, the commonly used chip-spaced multipath channel model, the channel frequency response (which is a sum of exponents) is simply substituted into the second row of Equation 14 and the integration is performed (recalling that receiver filtering limits the integration to the Nyquist band only). The result, after some change of integration variables, is:

$$\{T_l\}_{i,j} = 1/T_c \sum_k h_0([k+i-j]T_c) \cdot h_0(kT_c)^+$$

which yields the edge-effects neglecting approximation of Equation 24. With this approximation, the channel-dependent transformation is actually given (up to a constant gain factor of $$\frac{E\{|a_0(n)|^2\}}{\sum_{l=1}^{L} N_l/T_c}$$

by:

$$\left[ H_0 \cdot H_0^+ + \frac{N_0}{\sum_{l=1}^{L} N_l} \cdot I \right]^{-1} \cdot H_0 \quad \text{(Equation 25)}$$

If the in-cell MAI is large compared to the white noise modeling the out-of-cell MAI (i.e., $$\sum_{l=1}^{L} N_l \gg N_0 \right),$$

then Equation 25 reduces to the channel inverse. In such a case, the equalizer of Equation 25 completely restores the orthogonality of the users' codes that was destroyed by the channel. If, on the other hand, $$\sum_{l=1}^{L} N_l \ll N_0$$

(i.e., the white noise representing other-cell interference is the dominant factor), then Equation 25 reduces to a matched filter and the receiver reduces to the RAKE receiver (which is the optimal receiver for this setting). For any other setting, the equalizer in Equation 25 (or the one in Equation 22) will produce the best tradeoff (in the MSE sense) between mitigating same cell interference to the white noise component used for modeling out-of-cell interference.

It should be noted that this CDMA equalization technique can also be implemented using adaptive filter theory. That is, rather than operating in a batch-mode over the vector of samples $\bar{Y}_n$, one can operate sequentially and apply an adaptive filter to the received samples.

In some cases, a receiver knows the interference spectrum of other base stations. In such a case, a chip-rate equalizer can be derived while taking this additional information into account, leading to improved performance. Thus, the following parameters may be used in Equation 1: K=1 (i.e., the receiver is assumed to know only the signature of the desired user) and L=L$_1$+L$_2$>1 (where L$_1$ equals the number of users in the active base). It is known that all of the interfering signals from the active base undergo the same channel as the desired signal. This may be expressed as:

$$g_l(t)=h_0(t), l=1,\ldots,L \quad \text{(Equation 26)}$$

All of the other users (not from the serving cell) are modeled via the signals corresponding to l=L$_1$+1, ..., L$_1$+L$_2$.] It is also assumed that chip-rate sampling is being used.

The solution in this case is still given by the general framework of Equations 20-23. To gain some insight into this solution, a simplified two base-station scenario is assumed. Thus, in addition to Equation 26:

$$g_l(t)=h_1(t), l=L_1+1,\ldots,L_2 \quad \text{(Equation 27)}$$

(i.e., all of the interfering signals from the interfering base undergo the same channel). With this setting and the approximation of Equation 24, the following equalizer response is obtained:

$$\left[H_0 \cdot H_0^+ + \frac{\sum_{l=L_1+1}^{L_2} N_l}{\sum_{l=1}^{L_1} N_l} \cdot H_1 \cdot H_1^+ + \frac{N_0}{\sum_{l=1}^{L} N_l} \cdot I\right]^{-1} \cdot H_0 \quad \text{(Equation 28)}$$

The second term of Equation 28 provides a ratio of (i) noise power due to signals of users not served by the serving base station (e.g., other-cell MAI) to (ii) noise power due to signals of other users served by the serving base station (e.g., same-cell MAI). The third term of Equation 28 provides a ratio of (i) white noise power to (ii) noise power due to signals of other users served by the serving base station (e.g., same-cell MAI). If the main source of interference is the same-cell MAI then, as before, Equation 28 reduces to the channel inverse which restores the orthogonality of the signal signatures. If, on the other hand, the other-cell MAI and thermal noise are the dominant factor, then Equation 28 reduces to a matched filter in colored noise, which is the optimal solution in this scenario. In any other setting, the equalizer provides the best tradeoff between these two receivers.

In order to examine the improvement in performance of the equalizer of Equation 28 over the conventional practice of Equation 25, a simple two base station scenario is considered where the desired base station signal undergoes a flat fading channel and the interfering base station signal undergoes an AR(1) channel model $$\frac{1}{1-\alpha \cdot Z^{-1}}.$$

Suppose that the interfering base station signal is much stronger than the desired base station signal. Then, the conventional white noise equalizer will collapse to a unity transformation (i.e., it will do nothing and therefore be identical to a rake receiver), since the active base station undergoes flat fading. The SNR at the output of this equalizer would then be:

$$SNR_{\text{White\_Noise\_Equalizer}} = \frac{E\{|S|^2\}}{E\{|I|^2\} \cdot \frac{1}{1-\alpha^2}}$$

where $E\{|S|^2\}$ is the total transmitted power at the desired base station, $E\{|I|^2\}$ is the total transmit power of the interfering base station, and $$\frac{1}{1-\alpha^2}$$

is the sum of the impulse response squared taps that the interfering signal undergoes. Now, the colored noise equalizer will take into account the spectral shape of the interfering signal and will generate an equalizer that whitens the noise (recall that $E\{|S|^2\} \ll E\{|I|^2\}$, so the equalizer will roughly handle only the noise) and is followed by a matched filter to the noise whitener. Hence, with this model, the equalizer's frequency response is:

$$(1-\alpha \cdot Z^{-1}) \cdot (1-\alpha \cdot Z) = -\alpha \cdot Z + (1+\alpha^2) - \alpha \cdot Z^{-1}$$

where the first term, $(1-\alpha \cdot Z^{-1})$, is the noise whitener inverting the channel of the interfering BS; the second term, $(1-\alpha \cdot Z)$, is a matched filter of the "new" channel that the desired signal now undergoes. The SNR in this case (ignoring the same cell MAI whose influence is small under the assumption that $E\{|S|^2\} \ll E\{|I|^2\}$), may be expressed as follows:

$$SNR_{\text{Colored\_Noise\_Equalizer}} = \frac{E\{|S|^2\} \cdot [\alpha^2 + (1+\alpha^2)^2 + \alpha^2]}{E\{|I|^2\} \cdot [1+\alpha^2]}$$

The SNR gain of the colored noise equalization approach over the white noise equalizer (and over the RAKE receiver that in this case yields the same performance as the white noise equalizer) may be obtained by calculating the ratio of the two SNR expressions:

$$SNR\_Gain_{\text{Proposed\_Colored\_Equalizer\_Approach}} = \frac{1+4 \cdot \alpha^2 + \alpha^4}{1-\alpha^4}$$

As can be seen, the SNR gain approaches infinity when $\alpha$ approaches 1 (i.e., as the interference channel becomes more colored (deeper null), the SNR gain increases). Although discussed in the context of a relatively simple example, it can be shown that the same conclusion holds in more complex cases.

A better comparison would take the same cell MAI into account. In this case, the SNR of the white noise equalizer will not change, but the colored noise equalizer SNR would be:

$$SNR_{\text{Colored\_Noise\_Equalizer}} = \frac{E\{|S|^2\} \cdot (1+\alpha^2)^2}{E\{|I|^2\} \cdot [1+\alpha^2] + 2 \cdot E\{|S|^2\} \cdot \alpha^2}$$

The SNR gain in this scenario (over the white noise equalizer and the RAKE receiver) would be:

$$SNR\_Gain_{\text{Proposed\_Colored\_Equalizer\_Approach}} = \frac{(1+\alpha^2)^2}{1-\alpha^4 + 2\frac{E\{|S|^2\}}{E\{|I|^2\}} \cdot \alpha^2}$$

Again, when α approaches 1, the SNR gain approaches infinity (note that this solution is for the case $E\{|S|^2\} \ll E\{|I|^2\}$). Other cases can be analyzed similarly.

To achieve a linear MMSE MUD receiver architecture, the following parameters may be used in Equation 1: K= $k_1+k_2, \ldots, k_B$ (where $k_i$ is the number of users of the i-th base) and L=1. Also, it may be assumed that:

$$h_l(t) = \tilde{h}_1(t), \quad l = 1, \ldots, k_1$$
$$h_l(t) = \tilde{h}_2(t), \quad l = k_1+1, \ldots, k_1+k_2$$
$$\vdots$$
$$h_l(t) = \tilde{h}_B(t), \quad l = \sum_{i=1}^{B-1} k_i+1, \ldots, \sum_{i=1}^{B} k_i$$

(Equation 29)

where $\tilde{h}_i(t)$ denotes the channel between the i-th base station and the desired user. In this setting, the solution coincides with the full blown linear MMSE solution for the cellular down-link environment.

A complexity analysis performed for the full-blown linear MMSE multiuser detector described above revealed that its most computationally intensive portion is the generation of the matrix $E\{\overline{Y} \cdot \overline{Y}^+\}$, and not its inversion. Furthermore, this computational complexity is in direct proportion to the number of users in the system. This suggests the following efficient cost-performance compromise that uses MUD for some users and equalization for the rest. In at least one embodiment, the strongest K users in the system are selected and these K users are effectively handled by a linear MMSE MUD. For these users, $h_l(t)$ are assigned in a similar manner to Equation 29 above. The remaining L−1 users, who are less important as they are weaker (normally each of these users contributes less to the total interference than any of the K strongest users), are effectively treated using lower complexity equalization. For these weaker users, $g_l(t)$ are assigned in a similar manner to Equation 29 above.

To achieve such a receiver architecture, the parameters in Equation 1 may be selected as follows: K is a user definable parameter that determines the cost-performance tradeoff and L=the total number of users−K+1. Also, it may be assumed that:

$$h_l(t) = \tilde{h}_i(t) \qquad \text{(Equation 30)}$$

where the l-th user is assumed to belong to the i-th base station and, as before, $\tilde{h}_i(t)$ denotes the channel between the i-th base station and the desired user. All in all, this approach provides a very flexible and attractive cost-performance tradeoff. With sufficiently large values of K, the performance converges to that of the full-blown MMSE MUD. Yet, for smaller values of K accompanied by an efficient mechanism for choosing the strongest (most interfering) users, similar performance may be achieved at a much lower complexity.

In at least one embodiment of the invention, a symbol level approach is utilized (i.e., a receiver based on a bank of matched-filter outputs, rather than on received samples). In order to consider the symbol-level approach, both sides of Equation 12 are multiplied by some K×($m_2-m_1+1$) rectangular matrix A (which, in general, may be time varying), as follows:

$$\overline{X}_n \equiv A \cdot \overline{Y}_n = A \cdot P_{eq}(n) \cdot \overline{a}(n) + A \cdot \overline{e}(n) \qquad \text{(Equation 31)}$$

The special choice of $A=P^+_{eq}$ yields the bank of matched filter outputs, but other choices are possible. The MMSE solution now follows directly from the previous derivation as follows:

$$\hat{a}_0(n) = \sum_{k=1}^{K} b_k^*(n) \cdot x_k(n) = \overline{B}_n^+ \cdot \overline{X}_n \qquad \text{(Equation 32)}$$

and the MMSE solution is:

$$\overline{B}_n = E\{A \cdot \overline{Y}_n \cdot \overline{Y}_n^+ \cdot A^+\}^{-1} \cdot E\{A \cdot \overline{Y}_n \cdot a_0(n)^*\} \qquad \text{(Equation 33)}$$

The solution is now given by substituting Equation 7 and Equation 13 into Equation 33. In those cases where the matrix inversion is a computational bottle-neck, the above transformation reduces the dimensionality from $m_2-m_1+1$ to K, which may be much smaller. With large values of K, the performance would be close to that of the full-blown MMSE MUD. Also, with smaller values of K accompanied by an efficient mechanism for choosing the strongest users, the above receiver could provide similar performance to the MMSE MUD at a much lower complexity.

In some applications, multi-code transmission may be employed (i.e., a single user is assigned multiple code signatures, often in order to increase this user's throughput). In order to reduce the computational complexity, it may be desirable to represent the receiver as one front-end filter (that may be time-varying) that is common to all codes and then a conventional bank of despreaders (with each despreader tuned to a specific code). This structure follows immediately from Equation 6, Equation 7, and Equation 13 revealing that the basic operation $E\{\overline{Y}_n \cdot \overline{Y}_n^+\}^{-1}$ is common to all codes and needs to be followed by $E\{\overline{Y}_n \cdot a_0(n)^*\}$ (which is, of course, code specific).

Figure 3:
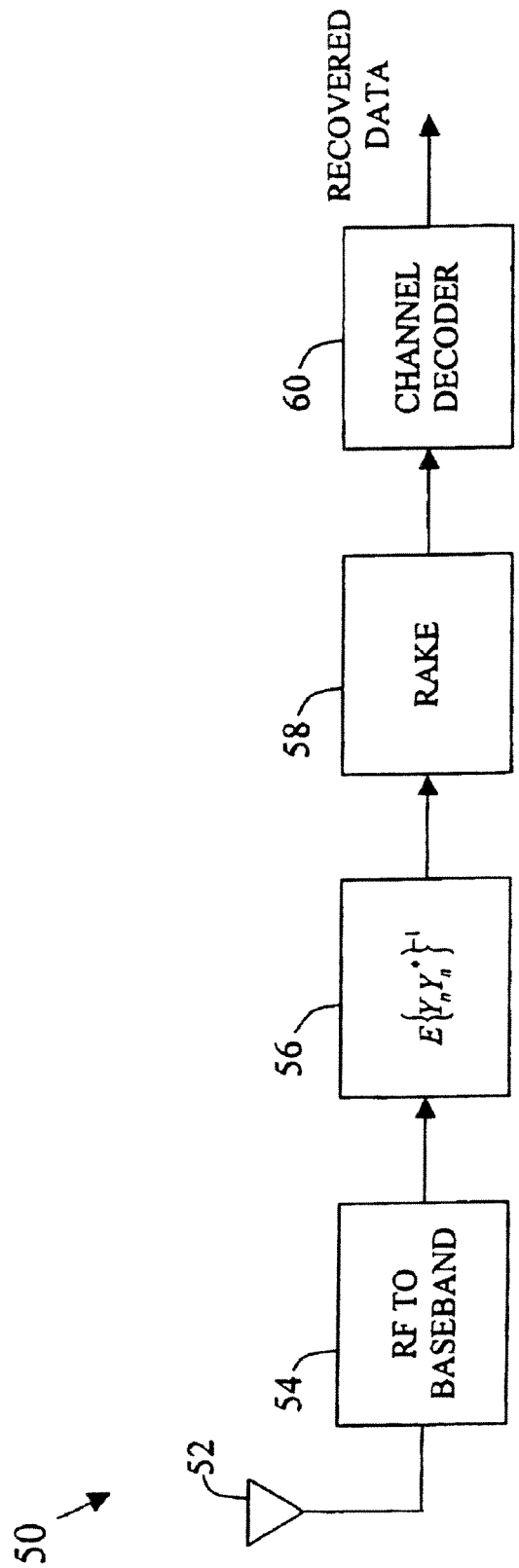
FIG. 3 is a block diagram illustrating an example receiver arrangement that may be used to represent the family of MUD receivers in accordance with an embodiment of the present invention.

The above-described family of receivers could easily be combined with a conventional RAKE receiver. To see this, it is noted that the cross-correlation term of Equation 7 (that appears in the general receiver structure of Equation 6) is in fact a RAKE receiver. FIG. 3 is a block diagram illustrating an example receiver arrangement 50 that may be used to represent the family of MUD receivers in accordance with an embodiment of the present invention. As illustrated, the receiver arrangement 50 includes: an antenna 52, an RF to baseband subsystem 54, a spectral whitening function 56, a RAKE receiver 58, and a channel decoder 60. The antenna 52, RF to baseband subsystem 54, and channel decoder 60 operate in substantially the same manner described previously. The spectral whitening function 56 processes the baseband samples output by the RF to baseband subsystem 54 in accordance with the first term on the right side of Equation 6. The resulting signal is delivered to the RAKE receiver 58 which processes it in accordance with the second term on the right side of Equation 6. The output of the RAKE receiver 58 is delivered to the channel decoder 18 for decoding. The above-described technique may be useful when upgrading an existing system that already builds upon a RAKE receiver.

In some cases it may be desirable to combine the proposed approach with interference cancellation. This may be the case, for example, when the interference cancellation can be performed utilizing the coding gain of the channel code (e.g., a convolution code or a turbo code). As an example of one possible implementation, consider the High Speed Downlink Packet Access (HSDPA) channel of wideband CDMA (WCDMA), where all the traffic signature codes of a base station may be allocated to one user at a particular point in time. Since the user is capable of decoding its own transmission, but normally not those of other users, it makes sense to try to perform coded interference cancellation on the same cell MAI and to treat all of the other MAI components using the above equalization and/or MUD approach. The optimal solution in this case (assuming perfect interference cancellation) is obtained by simply removing the components associated with the signals to be cancelled from the received signal. For example, in Equation 28 above, canceling the MAI of the desired cell amounts to replacing $$\sum_{l=1}^{L_1} N_l \text{ by } N_1.$$

This corresponds to the optimal chip-rate equalizer under the assumption that the MAI associated with the signals $n_2(t)$, $n_3(t)$, ..., $n_{n_1}(t)$ are perfectly canceled. In HSDPA applications, these signals would merely be the result of multi-code transmission to the desired user. After employing the turbo-decoding (and utilizing its coding gain), the original transmitted information symbols can be estimated and used for interference cancellation based on conventional re-encoding, re-modulation, and subtraction techniques.

Figure 4:
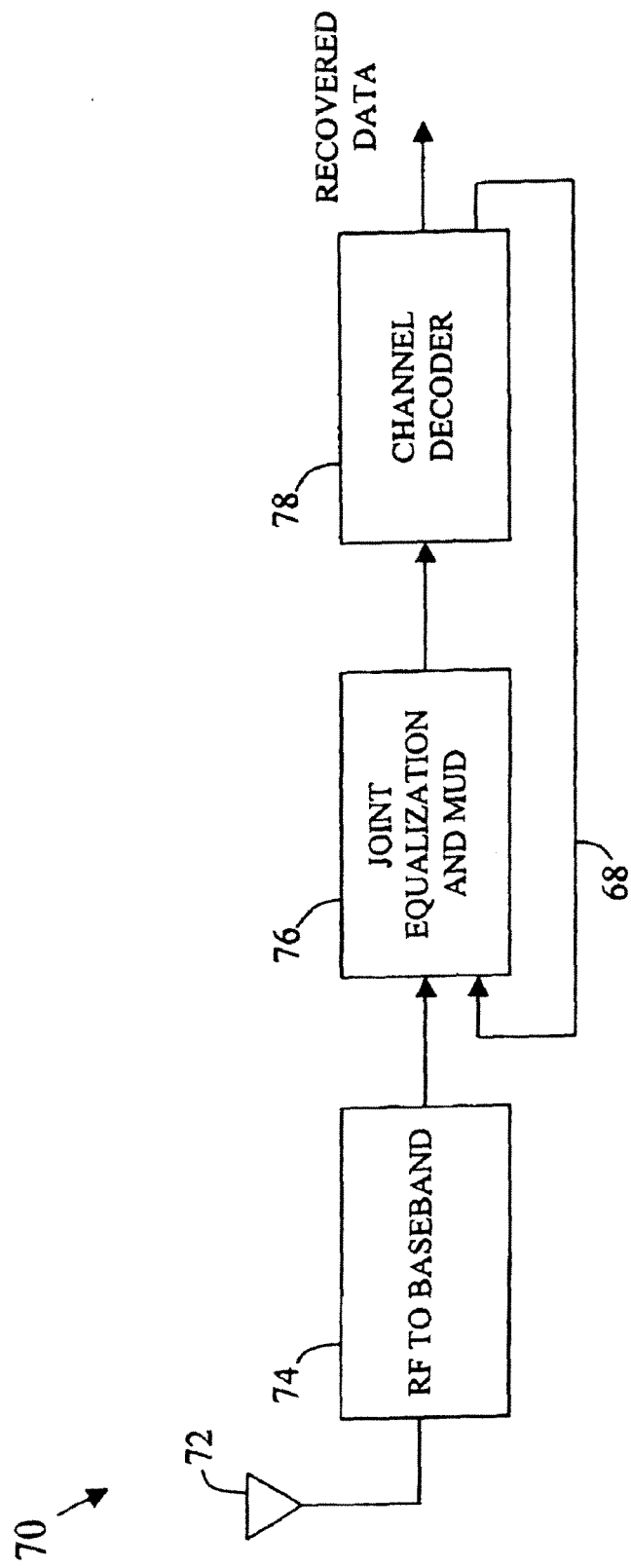
FIG. 4 is a block diagram illustrating an example receiver arrangement in accordance with an embodiment of the present invention, that may be used to implement interference cancellation techniques.

In one embodiment, this may be done iteratively. First, the weights are calculated as described above and all of the multi-codes are demodulated. Then, the total symbol stream (containing the symbols from all multi-code signals) is fed into the channel decoder. The output of the channel decoder is then re-encoded, interleaved and re-modulated to generate replicas of the multi-code signals. Next, the second demodulation iteration is performed, with the replicas of all the multi-codes, excluding the one being demodulated, being subtracted from the received signal. Thus, in this second demodulation iteration, the interference effects of the other multi-code signals is reduced resulting in improved demodulation performance. Again, the demodulated signals of the multi-codes are fed into the channel decoder whose output is used to construct a replica of the multi-code signals, and the process continues iteratively until a certain stopping criteria is satisfied. At each iteration, soft information (i.e., symbol reliability information) from the channel decoder output can be combined into the replica generation and subtraction mechanism so that symbols with low reliability are only partially subtracted (and vice-versa) in order to improve the convergence properties of this approach. This technique may be particularly suitable for turbo codes, where the decoding mechanism is iterative by nature and involves soft metric (symbol reliability) calculations. FIG. 4 is a block diagram illustrating an example receiver arrangement 70 in accordance with an embodiment of the present invention, that may be used to implement interference cancellation techniques. As illustrated, the receiver arrangement 70 may include at least one of: an antenna 72, an RF to baseband subsystem 74, a joint equalization and MUD unit 76, and a channel decoder 78. The antenna 72, the RF to baseband subsystem 74, the joint equalization and MUD unit 76, and the channel decoder 78 may operate in a similar manner to the components described previously in connection with FIG. 1. In addition, a feedback path 68 is provided to feed back decoded information from the channel decoder 78 for re-encoding, interleaving, re-modulation, and interference subtraction within the joint equalization and MUD unit 76 or elsewhere within the receiver arrangement 70. As described above, this may be performed as an iterative process.

Figure 5:
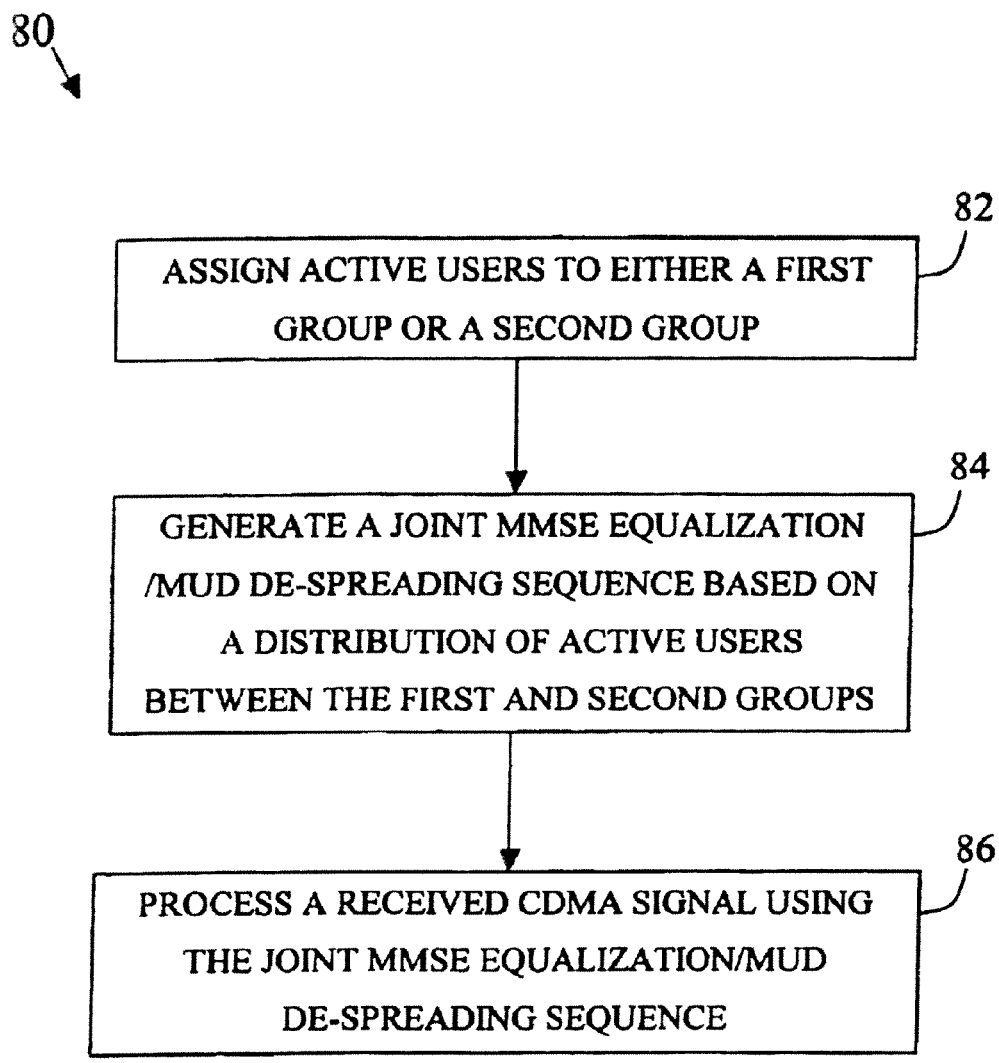
FIG. 5 is a block diagram illustrating an example method for use in a CDA receiver in accordance with an embodiment of the present invention.

FIG. 5 is a block diagram illustrating an example method 80 for use in a CDMA receiver in accordance with an embodiment of the present invention. Active users in a vicinity of a receiver are first assigned to either a first group or a second group (block 82). The term "active user" is used herein to denote a user that is presently communicating in a system and that will be considered during a detection process for a desired user. An active user may be associated with the serving base station or another base station. Users assigned to the first group may include, for example, users whose signature sequences are assumed to be known to the receiver and users assigned to the second group may include users whose signature sequences are assumed unknown to the receiver. Any of a variety of different user assignment criteria may be used to assign the users. In addition, the assignment criterion that is used may be user definable.

A joint MMSE equalization/MUD despreading sequence is next generated based on the distribution of active users between the first and second groups (block 84). This may be performed, for example, as described previously where various receiver architectures are achieved by using different values of K and L. A received CDMA signal is subsequently processed using the joint MMSE equalization/MUD despreading sequence (block 86). This may include, for example, multiplying baseband samples by the despreading sequence and then accumulating the results in an accumulator to de-spread the desired data. The type of processing that will be carried out using the joint MMSE equalization/MUD despreading sequence will typically depend upon how the active users were originally assigned. For example, when the first group includes only the desired user and the second group includes no users, the CDMA signal may be processed as in a RAKE receiver. When the first group includes all active users and the second group includes no users, the CDMA signal may be processed as in an MMSE MUD. When the first group includes only the desired user and the second group includes all other active users associated with the same base station as the desired user, the CDMA signal may be processed as in an MMSE equalizer. When the first and second groups each include multiple users, a combination of MMSE equalization and MMSE MUD processing may be performed. Other arrangements may alternatively be used.

In some embodiments, multiple receive antennas may be used. The above derivations may be extended to the multiple antenna case in a straightforward manner. In particular, the general solution of Equation 6 still holds but all vectors should be augmented to include the multiple antenna signals. For example, in the two antenna case, $\overline{W}_n$ should include the two antenna weight vectors $\overline{W}^{(1)}_n$ and $\overline{W}^{(2)}_n$ and the received signal should include the two antenna signals $\overline{Y}^{(1)}_n$ and $\overline{Y}^{(2)}_n$.

FIG. 6 is a block diagram of a communication system 100 according to an embodiment. The communication system 100 includes a first base station 104 (e.g., an active base station) that serves user receivers 108, 112. The desired user corresponds to receiver 108. Thus, in an embodiment, the following parameters may be used: K=1 (i.e., the receiver 108 is assumed to know only the signature of the desired user) and L equals the number of users served by the first base station 104. In other words, users 108, 112 may be assigned to one of two groups such that a first group includes the user 108 and a second group includes the users 112, according to an embodiment.

In an embodiment, the communication system 100 includes a second base station 116 (e.g., an interfering base station) that serves user receivers 120. Thus, in an embodiment, the following parameters may be used: K=1 (i.e., the receiver 108 is assumed to know only the signature of the desired user) and L equals the number of users in the served by the first base station 104 and by the second base station 108. In other words, the users 120 are assigned to the second group, according to an embodiment.

In an embodiment, the receiver 108 (corresponding to the desired user) includes a plurality of antennas 124 and an RF to baseband subsystem 128. The RF to baseband subsystem 128 converts received signals to baseband signals.

The receiver 108 includes an equalizer 132 and a despreader 136, according to an embodiment. The equalizer 132 is generated using channel information corresponding to the users 112 served by the first base station 104. In an embodiment, the equalizer 132 is generated also using channel information corresponding to the users 120 served by the second base station 116. The despreader 136 despreads using a spread code corresponding to the desired user. A channel decoder 140 recovers the user data for the desired user.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method, comprising:
    assigning a desired user in a first plurality of users to a first group and other users in the first plurality of users to a second group, wherein the first plurality of users are served by a base station;
    assigning a second plurality of users served by another base station to the second group;
    generating a minimum mean square error (MMSE) equalizer using channel information for the first plurality of users and corresponding to a plurality of receive antennas, wherein generating the MMSE equalizer includes,
        using a ratio of (i) white noise power to (ii) noise power due to code division multiple access (CDMA) signals corresponding to the first plurality of users,
        using channel information for the second plurality of users,
        using a ratio of (i) noise power due to CDMA signals corresponding to the second plurality of users to (ii) the noise power due to CDMA signals corresponding to the first plurality of users;
    wherein the method further comprises:
        filtering the CDMA signals received by the plurality of receive antennas using the MMSE equalizer, the CDMA signals including overlapping signal components corresponding to the first plurality of users; and
        despreading the filtered CDMA signals using a spread code corresponding to the desired user.

2. The method of claim 1, wherein generating the MMSE equalizer comprises treating CDMA signals corresponding to users served by another base station as white noise.

3. The method of claim 1, wherein generating the MMSE equalizer comprises assuming that each signal component corresponding to the first plurality of users undergoes the same channel.

4. The method of claim 3, wherein generating the MMSE equalizer comprises utilizing a Toeplitz matrix corresponding to a channel corresponding to the desired user.

5. The method of claim 1, wherein generating the MMSE equalizer comprises utilizing a Toeplitz matrix corresponding to a channel corresponding to one of the second plurality of users.

6. The method of claim 1, further comprising generating user data corresponding to the desired user by detecting symbols corresponding to the desired user in the CDMA signals after despreading.

7. An apparatus, comprising:
    a minimum mean square error (MMSE) equalizer to filter code division multiple access (CDMA) signals corresponding to radio frequency signals received by a plurality of antennas;
    wherein a desired user is included in a first plurality of users served by a base station, wherein a second plurality of users is served by another base station, and wherein weights of the MMSE equalizer are generated
        using channel information corresponding to the plurality of antennas for the first plurality of users served by the base station,
        using a ratio of (i) white noise power to (ii) noise power due to code division multiple access (CDMA) signals corresponding to the first plurality of users,
        using channel information for the second plurality of users,
        using a ratio (i) noise power due to CDMA signals corresponding to the second plurality of users to (ii) the noise power due to CDMA signals corresponding to the first plurality of users;
    wherein the apparatus further comprises a despreader coupled to the MMSE equalizer to despread the filtered CDMA signals using a spread code corresponding to the desired user.

8. The apparatus of claim 7, wherein weights of the MMSE equalizer are generated based on treating CDMA signals corresponding to users served by another base station as white noise.

9. The apparatus of claim 7, wherein weights of the MMSE equalizer are generated assuming that each signal component corresponding to the first plurality of users undergoes the same channel.

10. The apparatus of claim 9, wherein weights of the MMSE equalizer are generated utilizing a Toeplitz matrix corresponding to a channel corresponding to the desired user.

11. The apparatus of claim 7, wherein weights of the MMSE equalizer are generated utilizing a Toeplitz matrix corresponding to a channel corresponding to one of the second plurality of users.

12. The apparatus of claim 7, further comprising a decoder coupled to the despreader to recover user data corresponding to the desired user from despread CDMA signals.

13. A system comprising:
    a plurality of receive antennas to receive a code division multiple access (CDMA) signal from a wireless channel;
    a radio frequency to baseband subsystem coupled to the plurality of receive antennas;
    a minimum mean square error (MMSE) equalizer coupled to the radio frequency to baseband subsystem to filter code division multiple access (CDMA) signals corresponding to radio frequency signals received by the plurality of receive antennas;
    wherein a desired user is included in a first plurality of users served by a base station, wherein a second plurality of users is served by another base station, and wherein weights of the MMSE equalizer are generated using channel information corresponding to the plurality of receive antennas for the first plurality of users served by the base station, using a ratio of (i) white noise power to (ii) noise power due to code division multiple access (CDMA) signals corresponding to the first plurality of users, using channel information for the second plurality of users, using a ratio of (i) noise power due to CDMA signals corresponding to the second plurality of users to (ii) the noise power due to CDMA signals corresponding to the first plurality of users;

wherein the system further comprises:

a despreader coupled to the MMSE equalizer to despread the filtered CDMA signals using a spread code corresponding to the desired user; and a decoder coupled to the despreader to recover user data corresponding to the desired user from despread CDMA signals.

14. The system of claim 13, wherein weights of the MMSE equalizer are generated based on treating CDMA signals corresponding to users served by another base station as white noise.

15. The system of claim 13, wherein weights of the MMSE equalizer are generated assuming that each signal component corresponding to the first plurality of users undergoes the same channel.

16. The system of claim 15, wherein weights of the MMSE equalizer are generated utilizing a Toeplitz matrix corresponding to a channel corresponding to the desired user.

17. The system of claim 13, wherein weights of the MMSE equalizer are generated utilizing a Toeplitz matrix corresponding to a channel corresponding to one of the second plurality of users.

* * * * *